(12) United States Patent
Goodman (10) Patent No.: US 8,275,878 B2
(45) Date of Patent: Sep. 25, 2012

(54) ROUTER ANALYSIS SYSTEM (75) Inventor: Lee N. Goodman, Tyngsboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 795 days.

(21) Appl. No.: 12/038,944

(22) Filed: Feb. 28, 2008

(65) Prior Publication Data

US 2009/0222575 A1  Sep. 3, 2009

(51) Int. Cl.
G06F 15/173 (2006.01)

(52) U.S. Cl. ........................................ 709/224

(58) Field of Classification Search .............. 726/11; 709/223
See application file for complete search history.

(56) References Cited

U.S. PATENT DOCUMENTS

| | | | |
|---|---|---|---|
| 7,254,832 B1* | 8/2007 | Christie, IV | 726/11 |
| 7,340,771 B2* | 3/2008 | Chan et al. | 726/12 |
| 7,406,709 B2* | 7/2008 | Maher et al. | 726/12 |
| 7,420,943 B2* | 9/2008 | Lakshmi Narayanan et al. | 370/331 |
| 7,773,528 B2* | 8/2010 | Ariyoshi et al. | 370/241 |
| 8,014,328 B2* | 9/2011 | Oishi et al. | 370/310 |
| 2003/0195861 A1* | 10/2003 | McClure et al. | 707/1 |
| 2004/0039938 A1* | 2/2004 | Katz et al. | 713/201 |
| 2004/0128554 A1* | 7/2004 | Maher et al. | 713/201 |
| 2004/0255156 A1* | 12/2004 | Chan et al. | 713/201 |
| 2005/0076235 A1* | 4/2005 | Ormazabal et al. | 713/201 |
| 2005/0251858 A1* | 11/2005 | DelRegno et al. | 726/22 |
| 2006/0013147 A1* | 1/2006 | Terpstra et al. | 370/252 |
| 2006/0029083 A1* | 2/2006 | Kettlewell et al. | 370/401 |
| 2007/0011731 A1* | 1/2007 | Le et al. | 726/11 |
| 2007/0124813 A1* | 5/2007 | Ormazabal et al. | 726/11 |
| 2008/0052401 A1* | 2/2008 | Bugenhagen et al. | 709/227 |
| 2008/0159168 A1* | 7/2008 | Ariyoshi et al. | 370/253 |
| 2009/0046720 A1* | 2/2009 | Streijl et al. | 370/394 |
| 2011/0138456 A1* | 6/2011 | Ormazabal et al. | 726/11 |
| 2011/0289578 A1* | 11/2011 | Bugenhagen et al. | 726/11 |

* cited by examiner

Primary Examiner — Douglas Blair
Assistant Examiner — Benjamin Ailes (57) ABSTRACT A device may receive a first message that indicates whether an application layer gateway is hosted on the router, send a second message to test whether a firewall on the router incorrectly blocks the second message from reaching a client, send a set of messages to detect a pinhole in the firewall, and generate a report that provides results of receiving the first message, sending the second message, and sending the set of messages.

20 Claims, 11 Drawing Sheets

ROUTER ANALYSIS SYSTEM

BACKGROUND

A firewall or a network address translator (NAT) that is interposed between a private network and a public network may protect the private network against intrusion or attacks. The firewall may regulate a flow of network traffic between the private network and the public network based on packet characteristics, such as source network addresses, destination network addresses, port numbers, etc. The NAT may rewrite source addresses and port numbers of packets that originate from within the private network.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. The terms "message" or "packet," as used herein, may refer to one or more packets, datagram, cells; fragments of one or more packets, datagrams or cells; or other types of data.

In the descriptions that follow, a router analysis system may detect malfunctions of an edge router of a private network. In normal operation, the edge router may provide the private network with its own network address space and protect the private network against security violations and/or intrusions from an outside network. In some instances, however, the edge router may malfunction and prevent valid network traffic from flowing in and out of the private network. The router analysis system may determine causes of such malfunctions.

Figure 1:
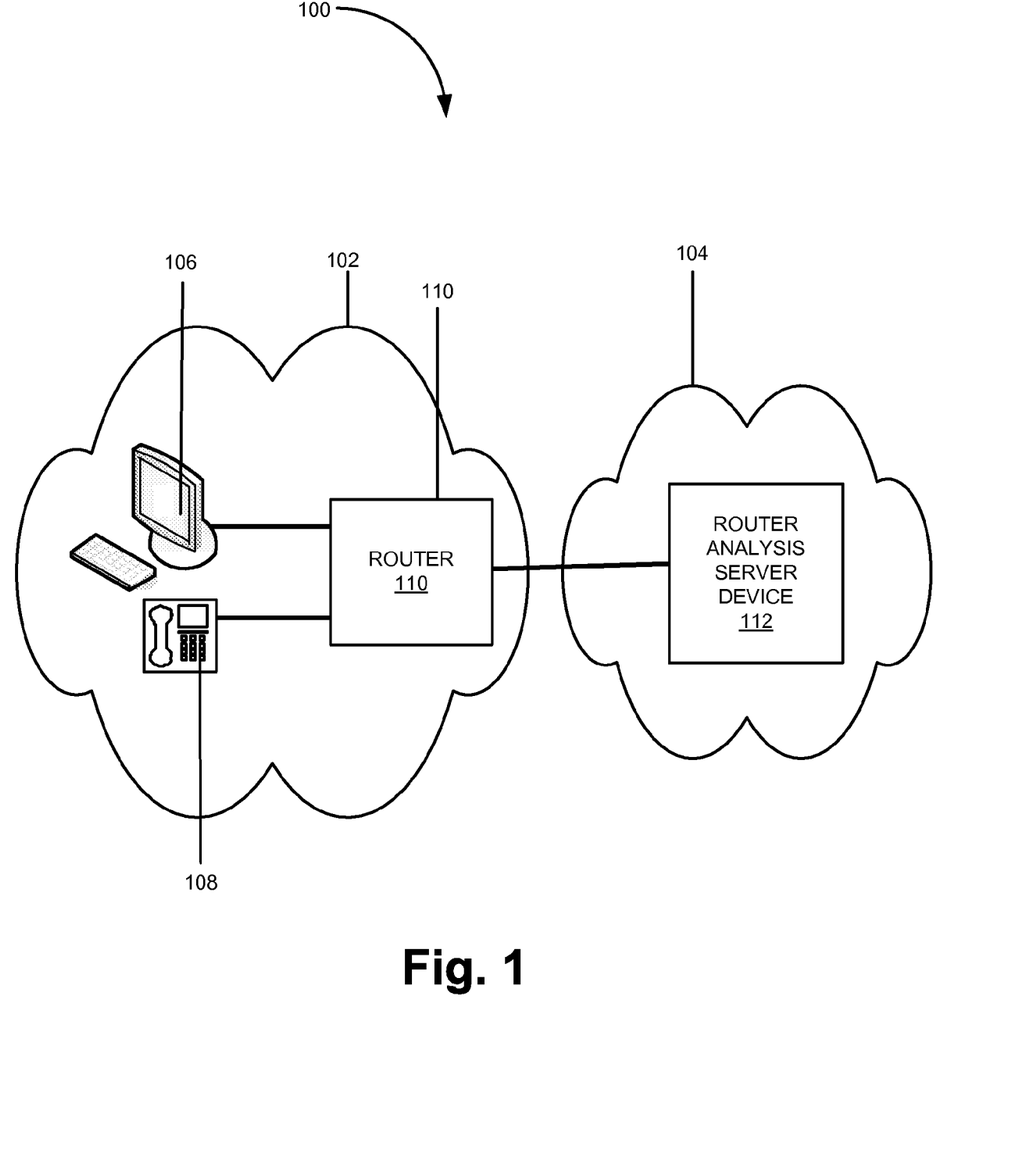
FIG. 1 is a diagram of an exemplary network in which concepts described herein may be implemented.

FIG. 1 is a diagram of an exemplary network 100 that illustrates exemplary concepts described herein. As shown, network 100 may include a private network 102 and an outside network 104. Private network 102 may include an intranet, a local area network (LAN), a wireless LAN (WLAN), a personal area network (PAN), a home-based network, a wireless PAN, or a combination of networks. Outside network 104 may include one or more private networks, a wide area network (WAN), a metropolitan area network (MAN), a cellular network, a public switched telephone network (PSTN), the Internet, any other network, or a combination of networks.

As further shown, private network 102 may include a router analysis client device 106, an application device 108, and a router 110. Depending on the implementation, private network 102 may include fewer, additional, or different devices than those illustrated in FIG. 1. For example, private network 102 may include additional application devices, such as a number of computing devices (e.g., personal computers (PCs), laptops, etc.), an Internet phone, a networked multimedia device (e.g., a television), etc.

Router analysis client device 106 may include a client component associated with one or more applications for testing whether packets directed to flow in/out of private network 102 are being correctly blocked and/or modified by components within router 110. Application device 108 may host an application (e.g., an Internet soft phone, an instant messenger client, an email client, etc.) that may depend on communication between devices in private network 102 and devices in outside network 104. Router 110 may include mechanisms for routing/forwarding packets, modifying network addresses of packets that flow in and out of private network 102, and protecting private network 102 against unauthorized egress/ingress of packets from private network 102/outside network 104.

Outside network 104 may include router analysis server device 112. Router analysis server device 112 may include a server component associated with one or more applications for testing whether packets directed to flow in/out of private network 102 are being correctly blocked and/or modified by components within router 110.

Figure 2:
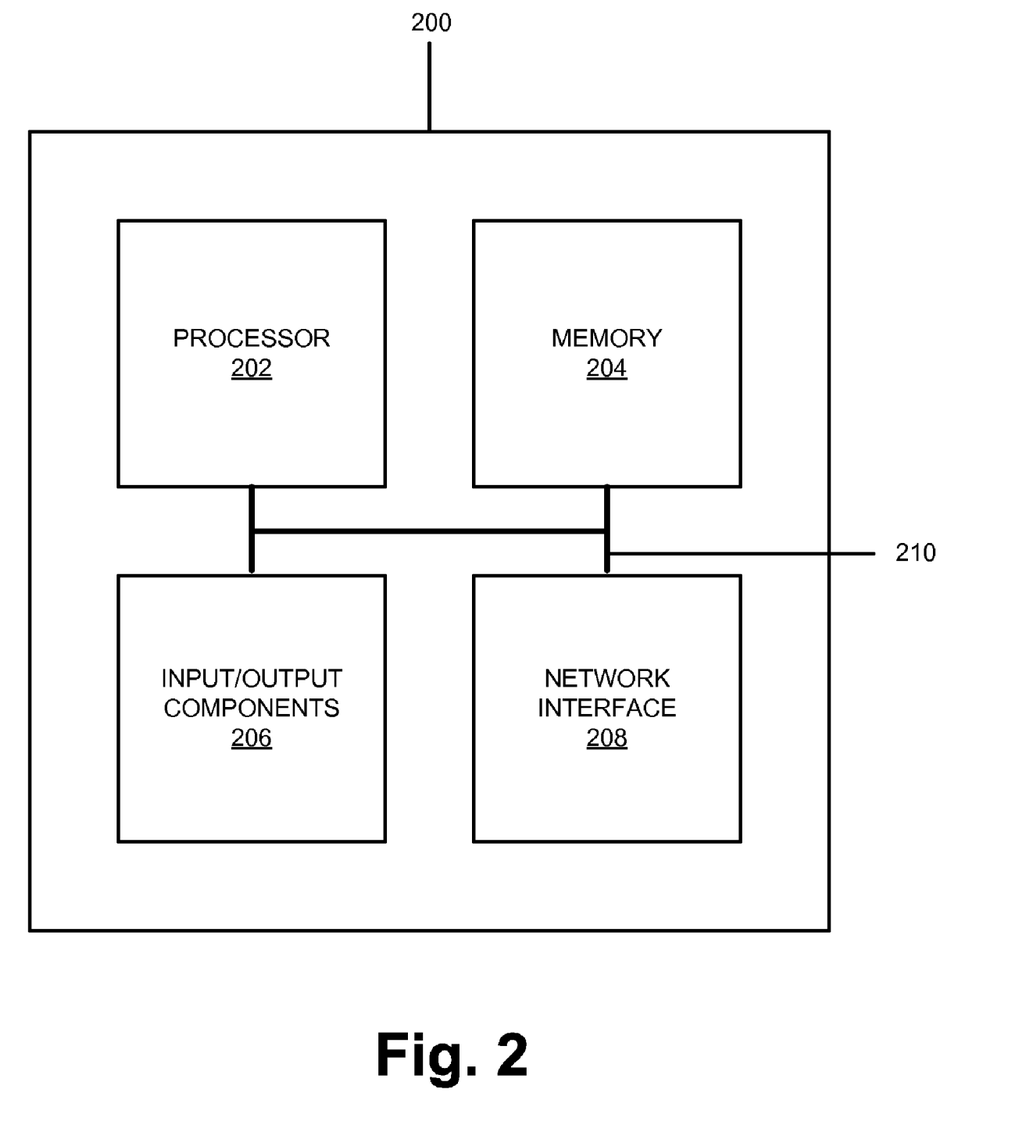
FIG. 2 is a block diagram of exemplary devices in FIG. 1.

FIG. 2 is a block diagram of a network device 200, which may correspond to router analysis client device 106, application device 108, router 110, and/or router analysis server device 112. As shown, network device 200 may include a processor 202, a memory 204, input/output components 206, a network interface 208, and a communication path 210. In different implementations, network device 200 may include additional, fewer, or different components than the ones illustrated in FIG. 2. For example, network device 200 may include additional line interfaces, such as interfaces for receiving and forwarding packets.

Processor 202 may include a processor, a microprocessor, an Application Specific Integrated Circuit (ASIC), a Field Programmable Gate Array (FPGA), and/or other processing logic capable of controlling network device 200. Memory 204 may include static memory, such as read only memory (ROM), and/or dynamic memory, such as random access memory (RAM), or onboard cache, for storing data and machine-readable instructions. Memory 204 may also include storage devices, such as a floppy disk, CD ROM, CD read/write (R/W) disc, and/or flash memory, as well as other types of storage devices.

Input/output components 206 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 200.

Network interface 208 may include any transceiver-like mechanism that enables network device 200 to communicate with other devices and/or systems. For example, network interface 208 may include mechanisms for communicating via a network, such as the Internet, a terrestrial wireless network (e.g., a WLAN), a satellite-based network, a WPAN, etc. Additionally or alternatively, network interface 208 may include a modem, an Ethernet interface to a LAN, and/or an interface/connection for connecting network device 200 to other devices (e.g., a Bluetooth interface).

Communication path 210 may provide an interface through which components of network device 200 can communicate with one another.

Figure 3:
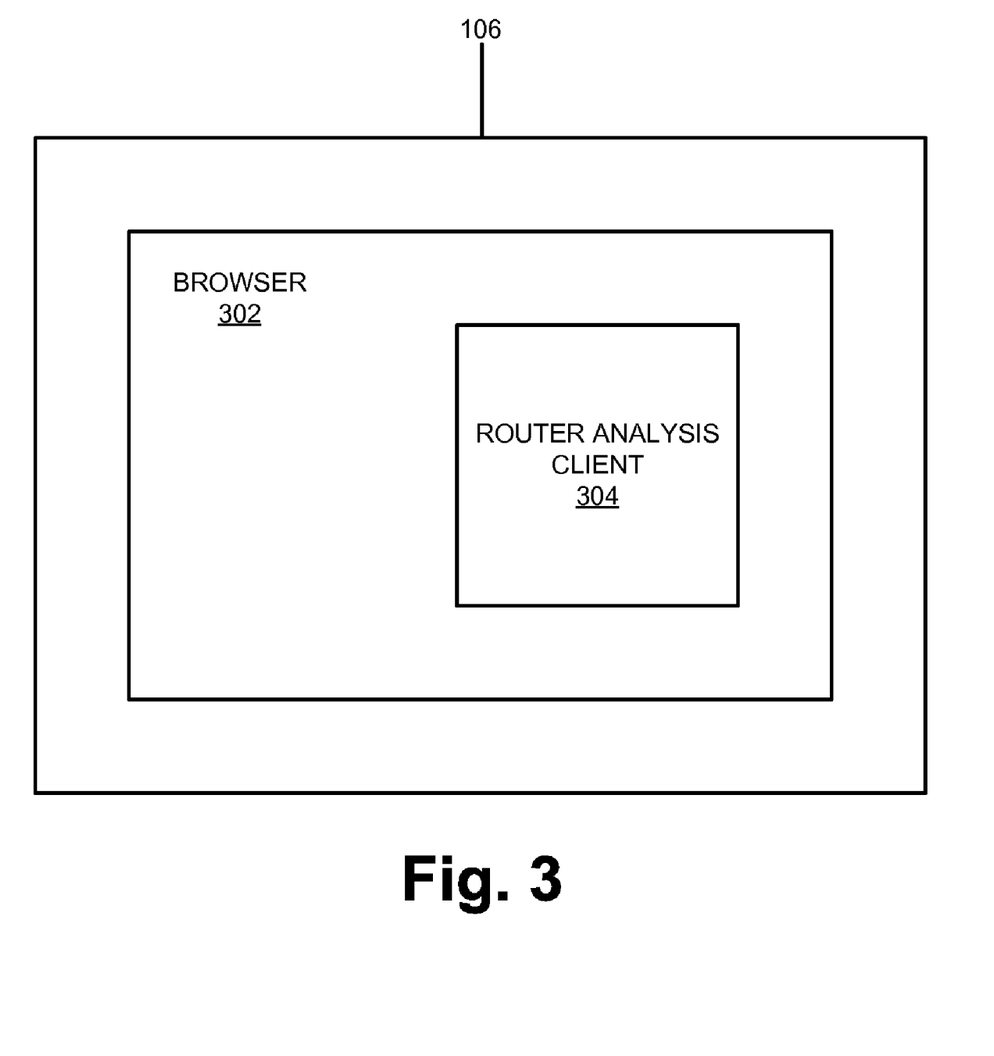
FIG. 3 is a functional block diagram of an exemplary router analysis client device in FIG. 1.

FIG. 3 is a functional block diagram of exemplary router analysis client device 106. As shown, router analysis client device 106 may include a browser 302. Depending on the implementation, router analysis client device 106 may include additional components, such as the components illustrated in network device 200, an operating system (e.g., Linux, Windows, etc.), an application (e.g., an email client), etc.

Browser 302 may enable a user to display and interact with text, images, programs, and other types of web information. As further shown in FIG. 3, browser 302 may include a router analysis client 304. In one implementation, router analysis client 304 may be implemented in the form of an applet, a web page, etc. In a different implementation, router analysis client 304 may be installed as a stand-alone application that is independent of browser 302.

Router analysis client 304 may interact with a server component in outside network 104 to test whether packets directed to flow in and out of private network 102 are being correctly blocked and/or modified by components within router 110. In some implementations, router analysis client 304 may provide a user interface (e.g., a graphical user interface (GUI)) via which the user may initiate different phases of testing router 110.

Figure 4:
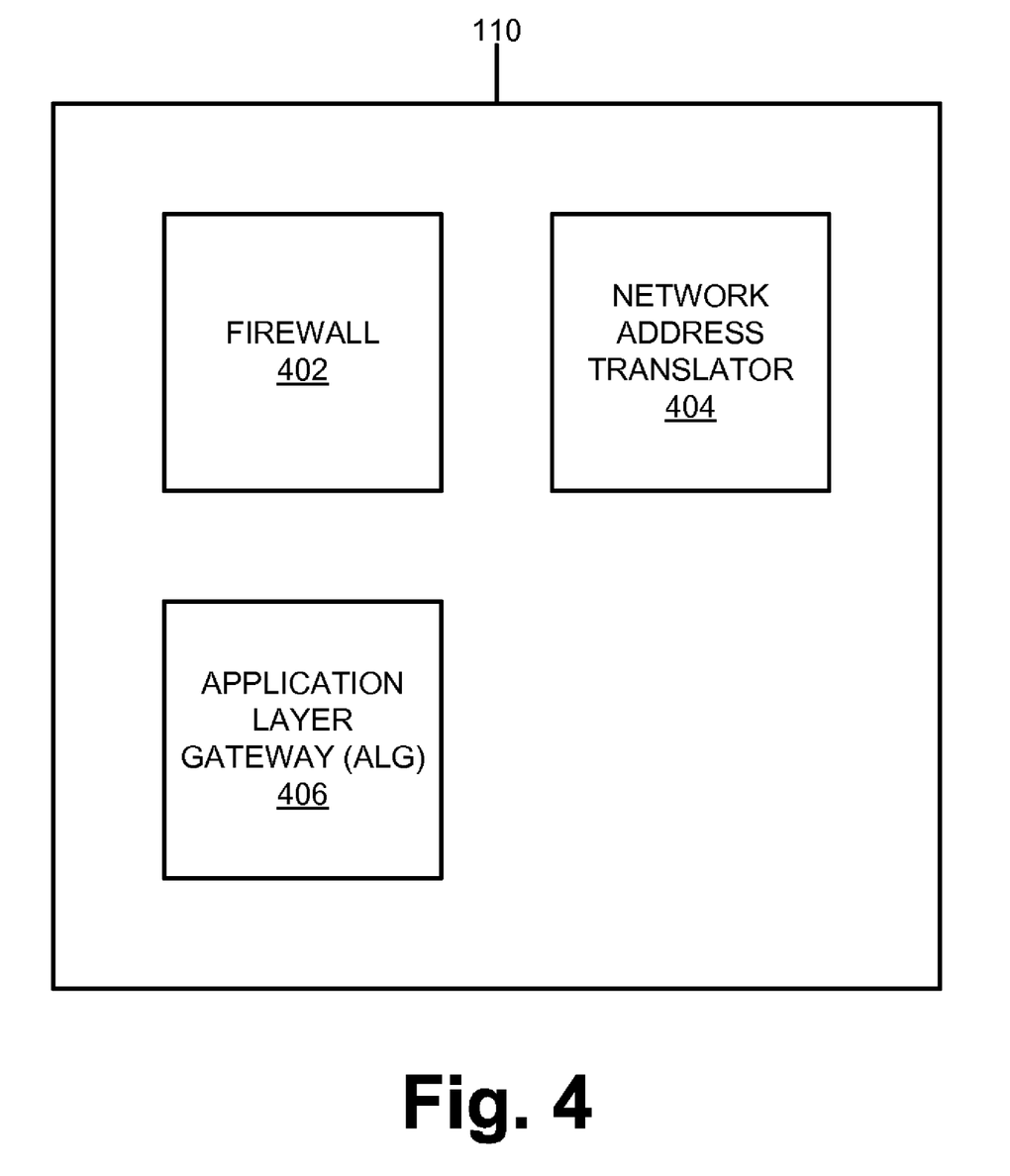
FIG. 4 is a functional block diagram of an exemplary router of FIG. 1.

FIG. 4 is a functional block diagram of router 110. As shown, router 110 may include a firewall 402, a network address translator (NAT) 404, and an application layer gateway (ALG) 406. Although not shown in FIG. 4, router 110 may include additional components, such as, for example, the components illustrated in network device 200, a routing engine, an operating system, etc. As further explained below, each of firewall 402, NAT 404, and/or ALG 406 may sometimes prevent valid packets from entering/exiting private network 102.

Firewall 402 may include hardware/software components for permitting or denying a packet from entering and/or exiting private network 102. In permitting or denying ingress/egress of a packet into/out of private network 102, firewall 402 may enforce rules that are related to source/destination addresses, port numbers, protocols, etc., of the packet. For example, firewall 402 may prevent a packet whose header contains a specific source address from entering private network 102.

Firewall 402 may allow a packet to enter private network 102, provided the packet bears an allowed port number and/or a network address in its header. As used herein, the term "pinhole" or "pin-hole" may refer to an allowed or open port number. In some implementations, however, firewall 402 may fail to keep a pinhole open for a particular amount of time that is required for communication between a device within private network (e.g., application device 108) and another device in outside network 104. For example, during a Session Initiation Protocol (SIP) session, firewall 402 may open a particular pinhole to permit a transmission and/or reception of Voice-over-Internet-Protocol (VoIP) data to/from private network 102. In some implementations, firewall 402 may prematurely close the pinhole and cause disruptions in the communication.

NAT 404 may include hardware/software components for rewriting a source address and/or a port number within a header of packet leaving private network 102. Such a translation of an internal address/port number of a packet from private network 102 may render internal addresses of private network 102 essentially invisible or indeterminable to devices in outside network 104.

Figure 5A:
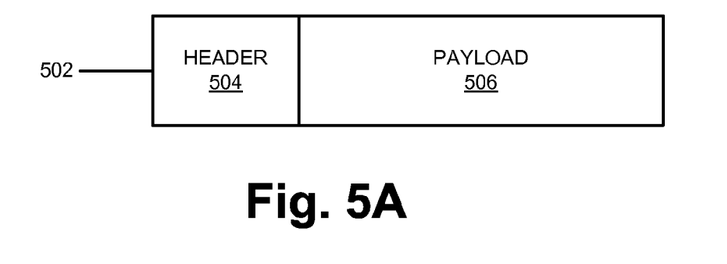
FIG. 5A depicts a packet.

FIG. 5A is a block diagram of a packet 502 that may leave private network 102 via NAT 404. As shown, packet 502 may include header 504 (e.g., an Open Systems Interconnection (OSI) Model layer 3 header) and payload 506. Packet 502 may include additional headers (e.g., a layer 2 header) although they are not illustrated in FIG. 5A. Header 504 may include addresses, such as a source Internet Protocol (IP) address, a destination IP address, a source port number, a destination port number, etc. Payload may include data that is carried by packet 502.

Figure 5B:
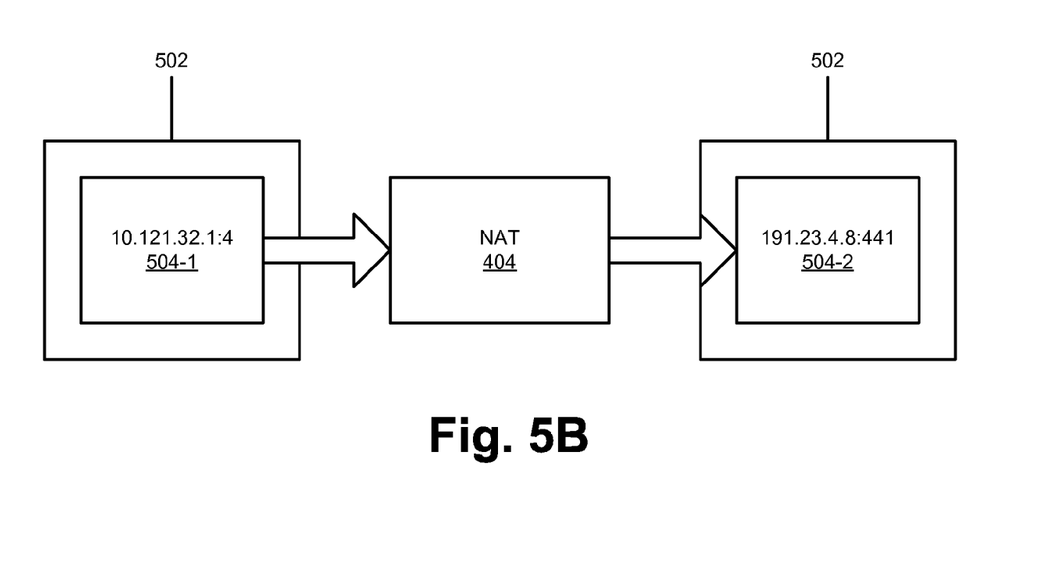
FIG. 5B illustrates how a source network address and a port number of the packet of FIG. 5A may be translated by a network address translator of FIG. 4.

FIG. 5B illustrates how a source network address and a port number of packet 502 may be translated by NAT 404. As shown, before packet 502 enters NAT 404 from within private network 102, packet 502 may include a header 504-1 with a particular network address and a port number (e.g., 10.121.32.1:4). After the network address and the port number are translated, packet 502 may include header 504-2, with a different network address and a port number (e.g., 191.23.4.8:441).

Returning to FIG. 4, ALG 406 may include hardware/software components for correcting network address translation errors that may be introduced by NAT 404. As illustrated above, NAT 404 may translate packet 502's source address and port number by modifying packet header 504. If packet 502 includes a source address and/or a port number in payload 506, NAT 404 may produce a defective packet, as NAT 404 may not translate the source address and/or the port number in payload 506. As a result, the network addresses that are included in payload 506 may conflict with the addresses in header 504. To correctly translate the network addresses, ALG 406 may update the addresses in payload 506, to render the addresses in payload 506 consistent with those in header 504. In some implementations, however, ALG 406 may fail to recognize some packets whose addresses are embedded in payload 506 and to rewrite these addresses.

In addition, in response to specific types of packets that arrive at router 110, ALG 406 may open one or more pinholes in firewall 402 and/or cause firewall 402 to allow certain types of packets to enter/exit private network 102. For instance, when router 110 receives a SIP message (e.g., a SIP INVITE message) from application device 108 in private network 102, ALG 406 may cause firewall 402 to allow an authentication challenge from a server device in outside network 104 to reach application device 108. If ALG 406 fails to allow the authentication challenge to reach application device 108, application device 108 may be unable authenticate its identity and/or register for services that are rendered by the server device.

Figure 6:
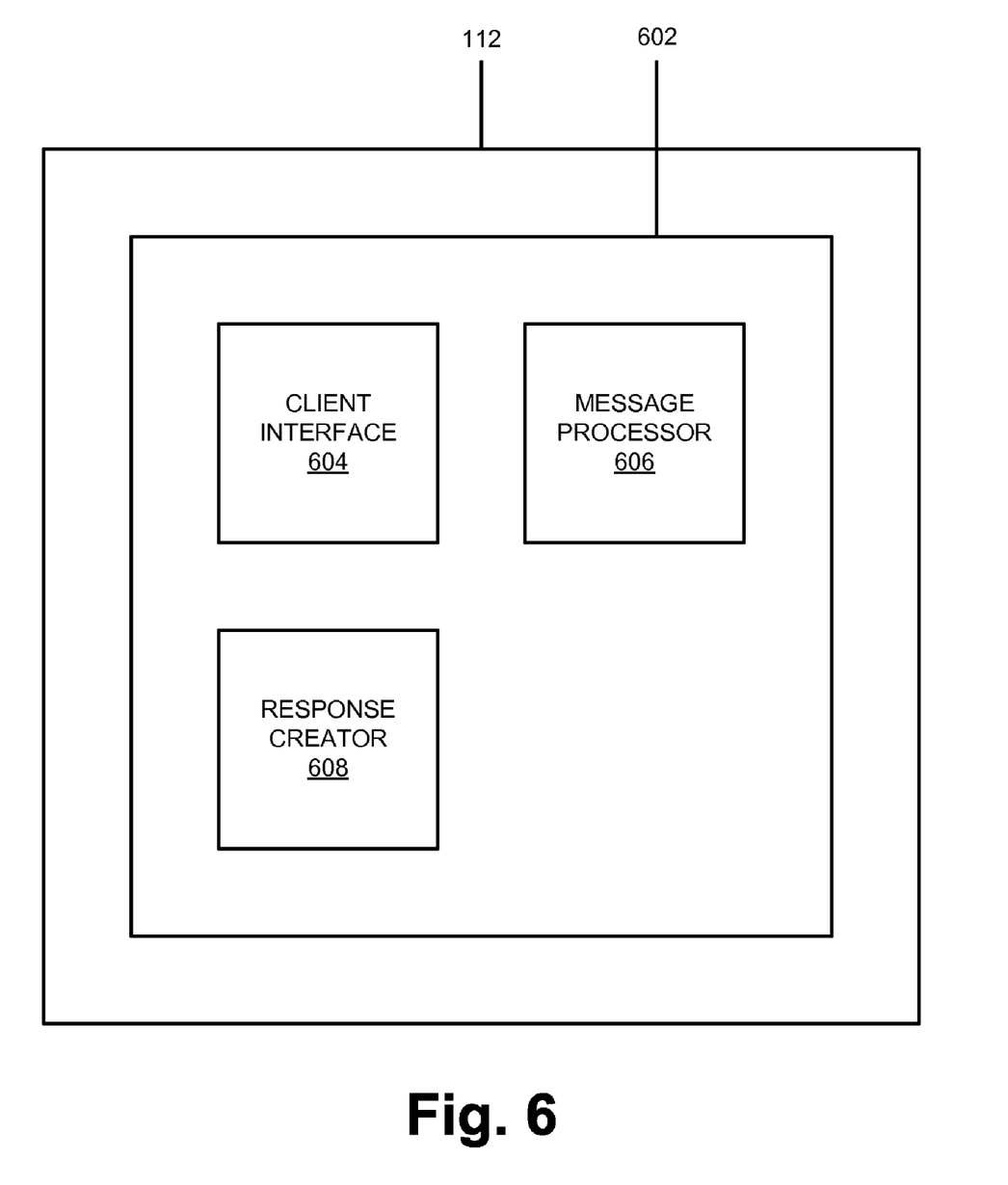
FIG. 6 is a functional block diagram of an exemplary router analysis server device of FIG. 1.

FIG. 6 is a functional block diagram of router analysis server device 112. As shown, router analysis server device 112 may include router analysis server 602. Router analysis server device 112 may also include additional components that are not shown in FIG. 6, such as an operating system, a routing engine, etc.

Router analysis server 602 may interact with router analysis client 304 in testing whether packets directed to flow in and out of private network 102 are being correctly blocked and/or modified by components within router 110 (e.g., firewall 402, ALG 406, etc.). Router analysis server 602 may be implemented in a number of different ways, such as with an application server component (e.g., JavaBeans™), a set of web pages, a stand-alone server application (e.g., a Java server application), a Microsoft .NET component, etc., and on different platforms (e.g., Java Enterprise platform, Microsoft .NET platform, Apache web server, etc.).

As further shown in FIG. 6, router analysis server 602 may include a client interface 604, a message processor 606, and a response creator 608. Client interface 604 may receive requests/messages from browser 302 or router analysis client 304 in private network 102, and provide the requests/messages to message processor 606. Message processor 606 may parse and/or analyze the request/messages and, depending on the result, may invoke response creator 608. Response creator 608 may send responses that may be used by router analysis client 304 to complete various tests on router 110. In addition, response creator 608 may send the result of the tests to router analysis client 304 and/or to another network device, such as an auto-configuration server (ACS) (not shown).

Figure 7:
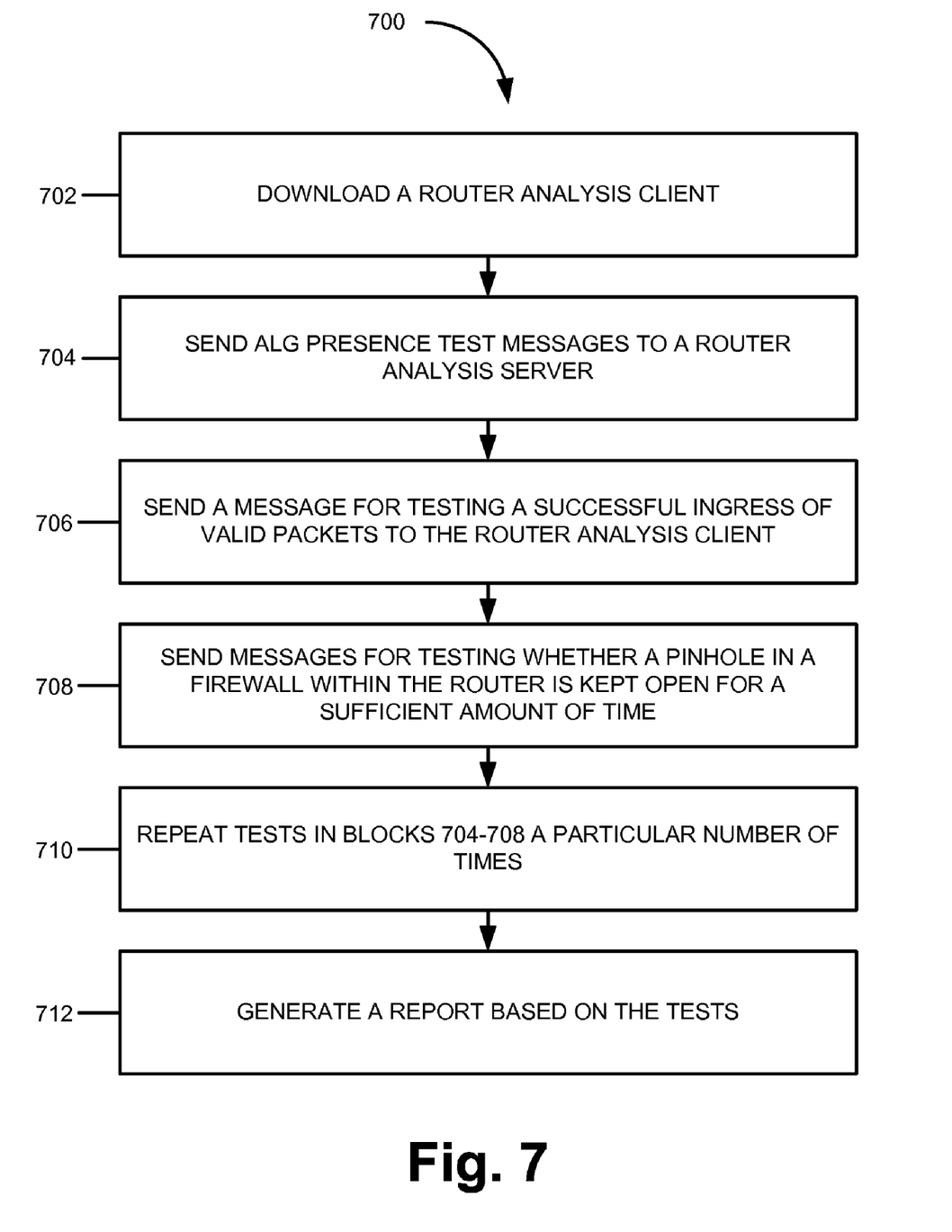
FIG. 7 is a flow diagram of an exemplary process for analyzing the exemplary router of FIG. 4.

The above paragraphs describe system elements that are related to devices and/or components for analyzing a router 110. FIG. 7 is a flow diagram of a process 700 that is capable of being performed by one or more of these devices and/or components.

As shown in FIG. 7, process 700 may begin at block 702, where router analysis client 304 may be downloaded to or loaded on router analysis client device 106. In one implementation, router analysis client 304 may be downloaded as an applet, a program, and/or a script in response to a user's action at browser 302 (e.g., a user's selection of an ALG test suite at a site provided by router analysis server 602). In other instances, the router analysis client 304 may be loaded directly via a disk, a USB device, etc. When the download/loading is complete, router analysis client 304 may start to run. In a different implementation, where router analysis client 304 is implemented as a stand-alone application, the user may start the client application.

Router analysis client 304 may send ALG presence test messages to router analysis server 602 (block 704). Router analysis server 104 may examine ALG presence test messages that are routed via router 110, record results of the examination, and send responses to router analysis client 304.

Figure 8:
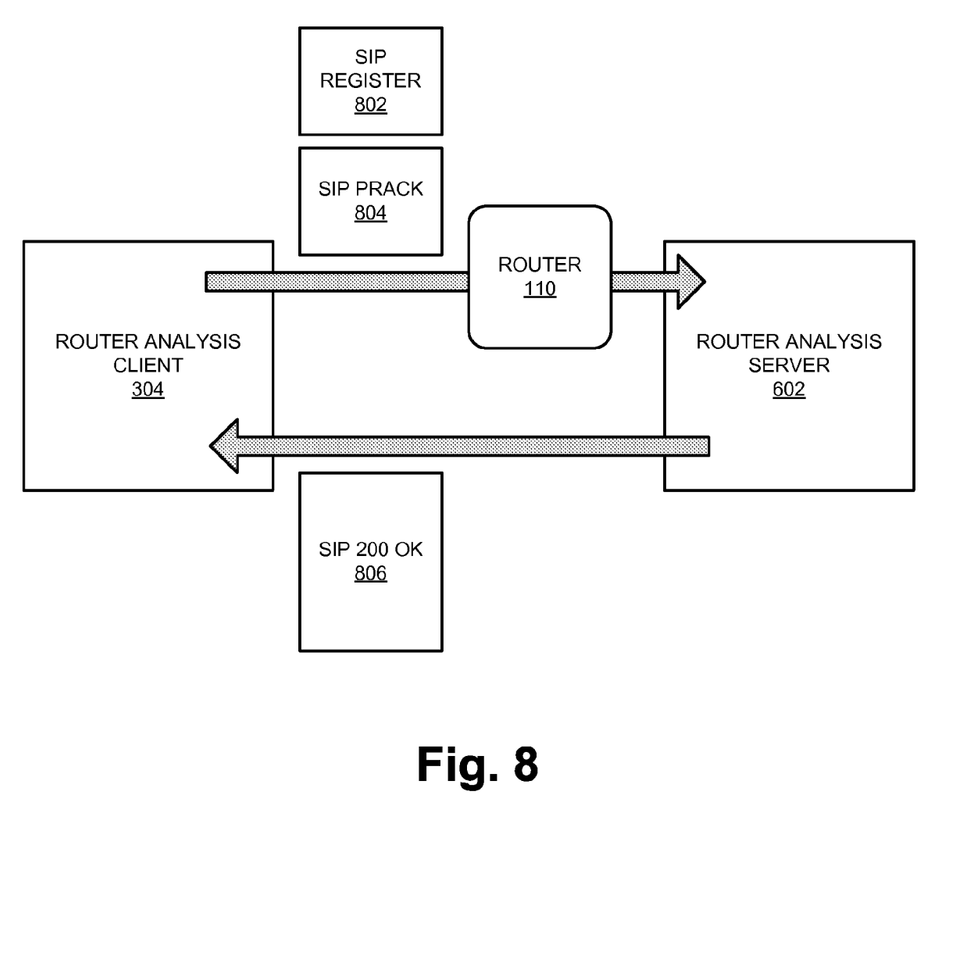
FIG. 8 illustrates an exemplary exchange of messages between an exemplary router analysis client of FIG. 3 and an exemplary router analysis server of FIG. 6 when the exemplary router analysis client and the exemplary router analysis server are detecting presence of an exemplary application layer gateway (ALG) of FIG. 4.

FIG. 8 illustrates an exemplary exchange of messages between router analysis client 304 and router analysis server 602. As shown, router analysis client 304 may send a SIP REGISTER message 802 to router analysis server 602 via router 110. In a normal SIP session, a REGISTER message may be sent from a SIP client to a SIP proxy and/or a registrar to subscribe to a particular service session.

In FIG. 8, router analysis server 602 may examine SIP REGISTER message 802 that arrives from router 110 for an indication whether ALG 406 may be present on router 110 (e.g., by determining whether a modification of an address within payload 506 has occurred), may record the result of the examination/scanning, and may send a SIP 200 OK message 806 (e.g., a message that indicates a successful performance of a SIP request) in response to SIP REGISTER message 802.

As further shown in FIG. 8, router analysis client 304 may send a SIP PRACK message 804 to router analysis server 602 via router 110. In a normal SIP session, a PRACK message may be sent as a response to a provisional message (e.g., messages that indicate provisional action, such as ringing of a SIP phone at the end of a VoIP call). As in the case with SIP REGISTER message 802, router analysis server 602 may examine SIP PRACK message 804 that arrives via router 110 for an indication whether ALG 406 has correctly handled SIP PRACK message 804 (e.g., correctly rewrote addresses in payload 506), Router analysis server 602 may record the result of the examination.

Router analysis server 602 may also send a message for testing ingress of valid packets into private network 102 to router analysis client 304 (block 706). Upon the reception of the test message, router analysis client 304 may send a return message to router analysis server 602. In turn, router analysis server 602 may record whether the return message has been received.

Figure 9:
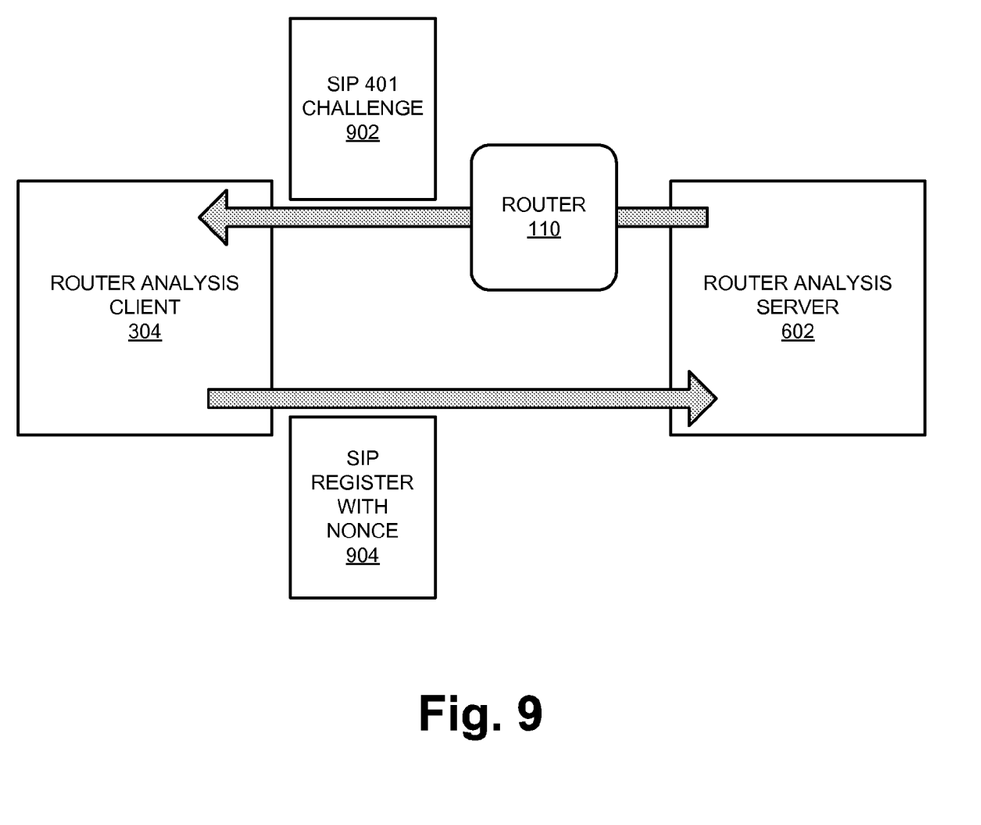
FIG. 9 illustrates an exemplary exchange of messages between the exemplary router analysis client and the exemplary router analysis server when the router analysis client and the router analysis server are testing whether the exemplary router of FIG. 4 blocks ingress of valid packets.

FIG. 9 illustrates an exemplary exchange of messages between router analysis server 602 and router analysis client 304 when router analysis server 602 and router analysis client 304 are testing whether router 110 blocks ingress of valid packets. In FIG. 9, router analysis server 602 may send a SIP 401 challenge 902 to router analysis client 304 via router 110. In a normal SIP session, a SIP 401 challenge may be issued by a server to validate the identity of a client application in private network 102.

In FIG. 9, if router analysis client 304 successfully receives SIP 401 challenge 902, router analysis client 304 may respond with SIP REGISTER message 904 with a nonce (e.g., a number used in cryptography). Such response from router analysis client 304 may indicate, to router analysis server 602, that router analysis client 304 has successfully received SIP 401 challenge 902. Not receiving SIP REGISTER message 904 with a nonce form router analysis client 304 may indicate, to router analysis server 602, that router 110 is blocking SIP 401 challenge from reaching router analysis client 304. Router analysis server 602 may record whether SIP REGISTER message with a nonce 904 has been successfully received within a particular amount of time.

Router analysis server 602 may send messages for testing whether a pinhole in firewall 402 within router 110 is kept open for a sufficient amount of time (block 708). Router analysis server 602 may periodically send, to router analysis client 304, a keep-alive message that causes firewall 402 to keep the pinhole open for a particular amount of time when the keep-alive message passes through firewall 402. For example, router analysis server 502 may periodically send a SIP OPTIONS to router analysis client 304 via router 110. When firewall 402 within router 110 detects the SIP OPTIONS message, firewall 402 may keep open a pinhole that is associated with SIP OPTIONS message for a particular amount of time.

After the transmission of each keep-alive message, router analysis server 602 may send a series of messages to router analysis client 304. Duration of time for which the series of messages are received by router analysis client 304 may indicate the amount of time for which a keep-alive message keeps a pinhole open. Router analysis client 304 may convey, to router analysis server 602, which of the series of messages have or have not been received. Based on the information from router analysis client 304, router analysis server 602 may identify the open pinhole and the duration for which the pinhole has remained open. Router analysis server 602 may record information related to the pinhole.

Figure 10:
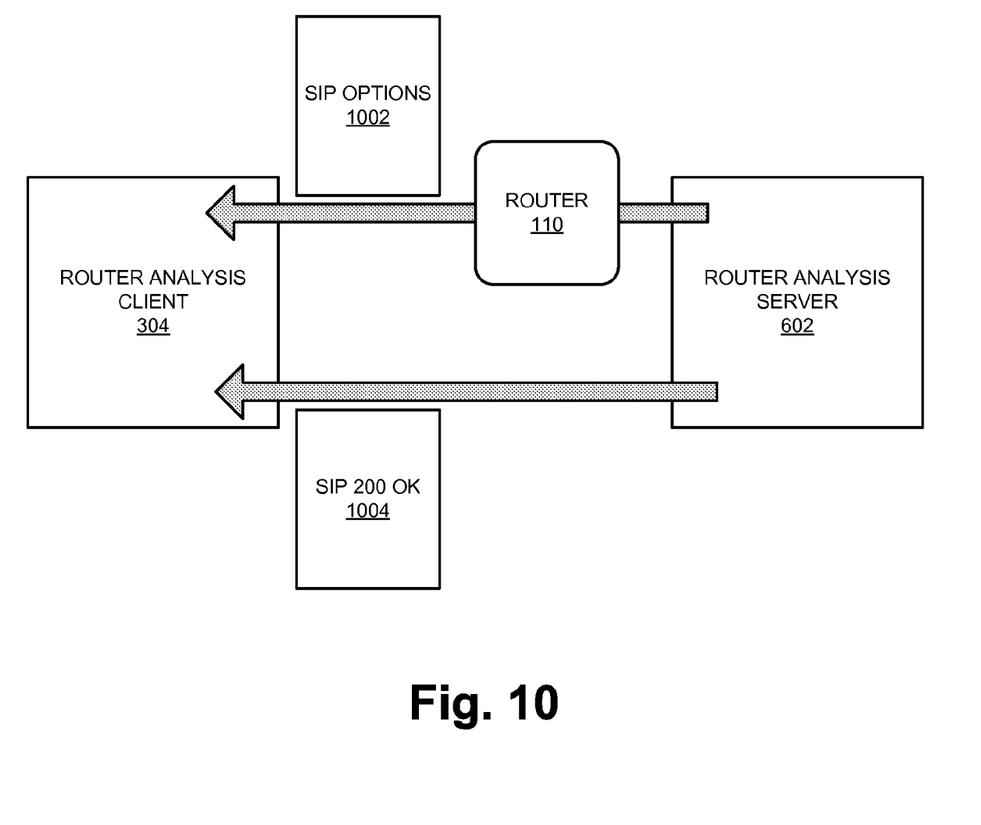
FIG. 10 illustrates an exemplary exchange of messages between the exemplary router analysis client and the exemplary router analysis server when the exemplary router analysis client and the exemplary router analysis server are testing whether a pinhole on an exemplary firewall of FIG. 4 remains open for a sufficient amount of time.

FIG. 10 illustrates an exemplary exchange of messages between router analysis client and 304 and router analysis server 602 when router analysis client 304 and router analysis server 304 are testing whether a pinhole in firewall 402 remains open for a sufficient amount of time. As shown router analysis server 602 may send SIP OPTIONS requests 1002 to router analysis client 304 periodically (e.g., every 30 seconds) via router 110. In addition, router analysis server 602 may send SIP 200 OK messages 1004 to router analysis client 304.

Router analysis client 304 may continue to detect SIP 200 OK messages 1004. When router analysis server 602 has finished sending SIP 200 OK messages for a predetermined amount of time, router analysis server 602 may send SIP OPTIONS request 1002 to router analysis client. In addition, router analysis server 602 may send SIP 200 OK messages 1004 to router analysis client 304 for a longer duration. By increasing the duration of time for which SIP 200 OK messages are sent, router analysis server 602 may provide a greater window of time during which the pinhole has a potential to close, and therefore, prevent SIP 200 OK messages from reaching router analysis client 304.

Router analysis server 602 and router analysis client 304 may continue to exchange SIP OPTIONS requests 1002 and SIP 200 OK messages 1004, gradually increasing the time interval between successive SIP OPTIONS requests 1002 are sent from router analysis server 602. When the time interval is greater than a particular amount of time for which the pinhole is kept open, after the particular amount of time elapses after SIP OPTIONS request 1002 passes through firewall 402, client 304 may not detect SIP 200 OK messages 1004.

Router analysis client 304 may send to router analysis server 602 a pinhole detection message when router analysis client 304 no longer detects SIP 200 OK messages 100. Alternatively, router analysis client 304 may indicate the length of time (after a SIP OPTIONS request 1002) after which router analysis client 304 no longer detects SIP 200 OK messages 1004. Router analysis server 304 may record information that may be obtained from the pinhole detection message, including the time and/or the length of time after which it no longer detects SIP 200 OK messages.

Router analysis client 304 and router analysis server 602 may repeat the tests that are performed at blocks 704-708 a particular number of times (block 710). For example, in one implementation, router analysis client 304 and router analysis server 602 may repeat the tests three times, in order to increase the statistical significance of the test results.

Router analysis server 602 may generate a report based on the tests (block 712). In some implementations, the report may be distributed to different devices, such as router analysis client device 106, an ACS, etc. In one implementation, the different device may be identified based on an identifier associated with the user (e.g., a personal handy-phone system (PHS) telephone number).

The report may indicate if router analysis client 304/server 602 has detected ALG 406, whether the ALG 406 malfunctions (e.g., whether ALG 406 recognizes SIP PRACK message 804), whether firewall 402 blocks a valid message (e.g., whether firewall 402 permits an authentication challenge to reach router analysis client 304), whether the router pinhole is closing prematurely, etc. Depending on the report, a user may take corrective actions (e.g., turn off ALG 406, reset a keep-alive timer to allow firewall 402 to keep a pinhole open for a longer duration, etc.).

Figure 11:
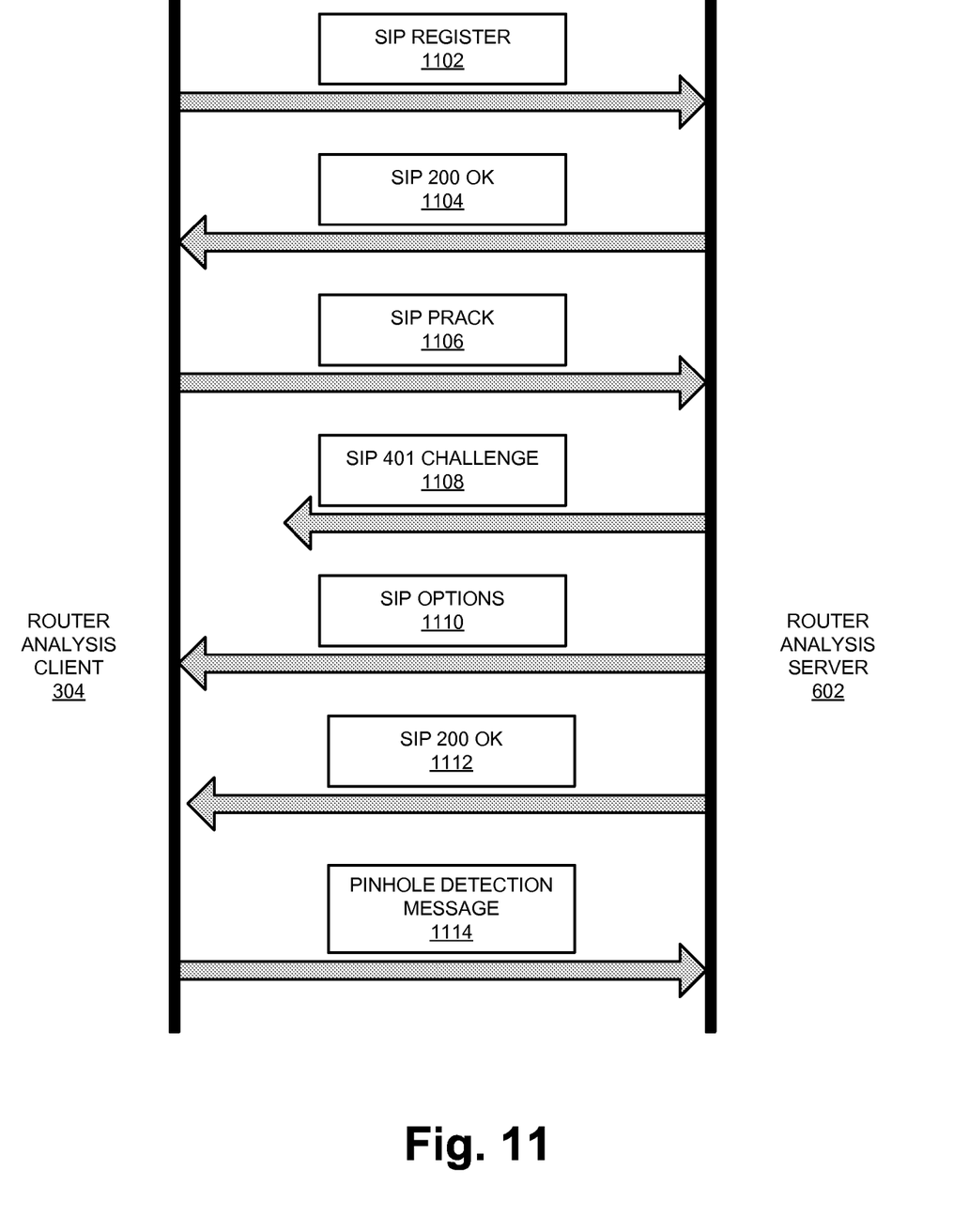
FIG. 11 illustrates an exchange of messages between the exemplary router analysis client and the exemplary router analysis server when the exemplary router analysis client and the exemplary router analysis server are testing the exemplary router of FIG. 4.

The following example, with reference to FIG. 11, illustrates a process for analyzing router 110. The example is consistent with exemplary process 700 described above with reference to FIG. 7.

For the example, assume that router analysis client 304 is implemented as an applet, and that router analysis client 304 has been downloaded to a personal computer. In addition, assume that router 110 is located in a communication path between router analysis client 304 and router analysis server 602.

In the example, router analysis client 304 begins by sending a SIP REGISTER message 1102 through router 110 to router analysis server 602, which responds with SIP 200 OK 1104. In addition, router analysis server 602 records that SIP REGISTER message 1102 has been correctly modified. Router analysis client 304 responds by sending SIP PRACK message 1106. Router analysis server 602 examines SIP PRACK message 1106 and records that an address in SIP PRACK message 1106 has not been correctly modified.

After receiving SIP PRACK message 1106, router analysis server 602 sends SIP 401 challenge 1108. However, firewall 402 in router 110 blocks SIP 401 challenge 1108 from reaching router analysis client 304, and router analysis client 304 is unable to respond to SIP 401 challenge 1108. Router analysis server 602 waits for a response from router analysis client 304 for a predetermined amount of time, and records the failure of router analysis client 304 to respond to SIP 401 challenge 1108.

Router analysis server 602 sends SIP OPTIONS request 1110 and SIP 200 OK messages 1112. Router analysis client 304 receives SIP 200 OK messages 1112 for a period of time, such as 20 seconds in the example, until a pinhole in firewall 402 closes. Router analysis client 304 sends a pinhole detection message 1114 to router analysis server 602, indicating the amount of time for which router analysis client 304 has received SIP 200 OK messages 1112. Router analysis server 602 records the information provided by router analysis client 304.

Router analysis server 602 packages records that are generated from the tests in a report. The report may indicate a presence of ALG 406, and that ALG 406 failed to correctly modify SIP PRACK message 1106. In addition, the report may indicate that router 110 blocked SIP 401 challenge 1108, and firewall 402 closes a pinhole after 20 seconds.

Based on the report, a user may upgrade ALG 406 on router 110 and/or modify a setting on router 110, such that SIP PRACK messages are correctly handled, SIP 401 challenges are no longer blocked by firewall 402, and the pinhole is permitted to stay open for a longer period of time, such as for 1 minute.

In the above example, router analysis client 304 and router analysis server 602 detect malfunctions of router 110 of private network 102. By exchanging test messages with one another through router 110, router analysis client 304 and router analysis server 602 may identify types of messages that are prevented from flowing in and out of private network 102, as well as router components (e.g., firewall 402, ALG 406, etc.) that may be responsible for preventing the messages from being correctly delivered to their destinations. Router analysis server 602 may generate a report based on the tests, and the user may be able to modify configurations of router 110 to resolve various issues that are identified. In a home router scenario, such testing may allow a user to determine if the home router is acting detrimental to a particular service or an application, such as a VoIP service/application.

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 7, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving, at a server device, over a network path between a client device and the server device, a first message, from the client device, that indicates whether an application layer gateway is hosted on a router, on the network path, between the client device and the server device;
   sending a second message, from the server device to the client device, to test whether a firewall on the router incorrectly blocks the second message from reaching the client device;
   receiving a reply from the client device in response to the second message when the firewall on the router allows the second message from the server device to be received at the client device, the reply indicating whether the router incorrectly blocks the second message;
   sending a set of messages from the server device to the client device to detect a pinhole in the firewall;
   receiving a pinhole detection message, from the client device in response to the set of messages, to indicate a detection of the pinhole in the firewall when the client device detects the pinhole in the firewall; and
   generating a report that provides results of receiving the first message that indicates whether an application layer gateway is hosted on the router, receiving the reply that indicates whether the router incorrectly blocks the second message, and receiving the pinhole detection message that indicates the detection of the pinhole.

2. The method of claim 1, where receiving a first message includes:
   determining whether a source address embedded in a payload of the first message matches a source address in a header of the first message.

3. The method of claim 1, where receiving a first message includes:
   determining whether the application layer gateway correctly modifies addresses that are embedded in a payload of the first message.

4. The method of claim 3, where receiving a first message includes:
   receiving at least one of a Session Initiation Protocol REGISTER message or a Session Initiation Protocol PRACK message.

5. The method of claim 1, where sending a second message includes:
   sending an authentication challenge; and
   waiting to receive a response to the authentication challenge from the client.

6. The method of claim 5, where sending an authentication challenge includes:
   sending a Session Initiation Protocol 401 challenge.

7. The method of claim 5, where waiting to receive a response includes: waiting to receive a Session Initiation Protocol REGISTER message with a nonce.

8. The method of claim 1, where sending a set of messages includes:
   sending Session Initiation Protocol OPTIONS messages to keep the pinhole open;
   or sending Session Initiation Protocol 200 OK messages.

9. The method of claim 8, where sending Session Initiation Protocol OPTIONS messages includes:
   sending Session Initiation Protocol OPTIONS messages at increasing time intervals.

10. The method of claim 8, where the pinhole detection message includes information that indicates whether the pinhole closes prematurely.

11. The method of claim 1, further comprising:
    sending to the client device an applet to be used as a client that sends the pinhole detection message.

12. The method of claim 1, where the report includes information indicating at least one of:
    whether the application layer gateway is hosted on the router;
    whether the application layer gateway correctly modifies the first message;
    whether the firewall incorrectly blocks the second message; or
    whether the firewall keeps the pinhole open for a sufficient amount of time.

13. The method of claim 1, further comprising at least one of:
    sending the report to the client device; or
    sending the report to an auto-configuration server.

14. A non-transitory computer-readable storage device comprising computer-executable instructions, the computer executable instructions including:
    instructions for sending a first message from an applet on a client device to a server device, over a network path from the client device to the server device, to test if an application layer gateway exists between the applet and the server device, on the network path;
    instructions for receiving by the applet an authentication challenge, from the server device, for testing whether a firewall, between the client device and the server device and on the network path, allows the authentication challenge from the server device to be received at the applet;

instructions for sending a second message from the applet to the server device over the network path in response to receiving the authentication challenge from the server device when the firewall, between the client device and the server device and on the network path, allows the authentication challenge from the server device to be received at the applet;

instructions for receiving by the applet a plurality of a particular type of messages, for detecting a pinhole, through the firewall from the server device; and instructions for sending a pinhole detection message from the applet to the server device to indicate a detection of the pinhole when the applet stops receiving the particular type of messages from the server device.

15. The non-transitory computer-readable storage device of claim 14, where the first message includes:
a Session Initiation Protocol REGISTER message; or
a Session Initiation Protocol PRACK message.

16. The non-transitory computer-readable storage device of claim 14, where the second message includes:
a Session Initiation Protocol REGISTER message with a nonce.

17. The non-transitory computer-readable storage device of claim 14, where the particular type of messages includes:
Session Initiation Protocol 200 OK messages.

18. The non-transitory computer-readable storage device of claim 14, further comprising: instructions for sending the applet to a browser on the client device.

19. The non-transitory computer-readable storage device of claim 14, where the server includes:
a web server;
an application server; or
a JavaBeans™ component.

20. A system comprising:
a router including an application layer gateway and a firewall;
a client device configured to:
  send a first message to a server device over a network path from the client device to the server device through the application layer gateway to test whether the application layer gateway operates correctly, wherein the router is between the server device and the client device, on the network path,
  send an authentication reply to the server device in response to an authentication challenge from the server device over the network path when the firewall allows the authentication challenge to be received at the client device, and
  send a pinhole detection message to the server device to indicate a detection of a pinhole in the firewall in response to receiving a plurality of messages from the server device; and
the server device configured to:
  receive the first message from the client device over the network path,
  determine whether the application layer gateway correctly modified addresses that are embedded in a payload of the first message in response to receiving the first message,
  send the authentication challenge to the client device through the firewall to test if the firewall incorrectly prevents the authentication challenge from being delivered to the client device,
  receive the authentication reply that indicates whether the firewall incorrectly prevented the authentication challenge from being delivered to the client device,
  send the plurality of messages to the client device through the firewall to detect the pinhole, and
  receive the pinhole detection message that indicates the detection of the pinhole in the firewall.

* * * * *